Patented Feb. 8, 1927.

1,616,631

UNITED STATES PATENT OFFICE.

WHARTON B. McLAUGHLIN, OF NEW YORK, N. Y.; CELIA BROWN McLAUGHLIN ADMINISTRATRIX OF THE SAID WHARTON B. McLAUGHLIN, DECEASED.

PROCESS OF PRODUCING DRY MILK.

No Drawing.    Application filed March 31, 1923.  Serial No. 629,221.

This invention relates to the art of preserving milk and has special reference to the manufacture of milk powders.

It has for its object the production of a dried milk product in which upon the addition of water the casein rapidly and easily enters colloidal solution.

It is well known that when milk is subjected to dialysis it can be separated into two parts, one containing the sugar and mineral salts, the other the proteids and fats.

It is also well known that when milk is reduced to powder it is difficult to cause the casein to re-enter colloidal solution.

It is also well known that when milk is reduced to powder it in a short time begins to undergo certain changes with the production of a characteristic odor and taste which renders it unfit for commercial use.

I have discovered that if milk, preferably concentrated, be heated, preferably to the boiling point, and maintained hot, preferably about one hour, there is a chemical reaction between a portion of the sugar and a portion of the proteids, with the production of a new product of well defined characteristics. One of these characteristics is the readiness with which the casein, in a powder obtained from this product, enters colloidal solution. I have found another characteristic to be a distinct alteration in flavor, which is probably due to the albumens which have been precipitated by heat reentering solution on account of the long exposure to the heat. I have also found that the addition of a small per cent of sugar increases the rapidity and ease with which this reaction takes place.

In carrying out my improved process for the production of my improved product, I preferably add about 2% of sugar to the milk and concentrate the mixture in any approved vacuum apparatus in the ordinary manner until it has a density of approximately 14° Baumé. With a super-heater I now blow it up with live steam, which serves to homogenize the fat globules and bring the temperature to the boiling point. It is now dropped into an insulated tank having a stirrer and allowed to remain about an hour when it can be dried by any apparatus for drying milk either drum or spray.

Having now described my invention, that which I claim as new, on which I desire to secure Letters Patent, is:—

1. A process for producing dry milk in powdered form, which consists in heating milk to a temperature not in excess of the boiling point thereof and maintaining same at a temperature not in excess of the boiling point for a substantial length of time, whereby a chemical change with a correspondingly distinct alteration in flavor takes place in the milk, and then drying the milk to a powder.

2. A process for producing dry milk which comprises concentrating said milk by evaporation to a substantial degree, heating said concentrated milk and maintaining same at a temperature not in excess of the boiling point for approximately one hour to produce a milk of altered flavor, and then drying the milk to a powder.

3. A process for producing dry milk which comprises concentrating milk at reduced pressure to a substantial degree, heating said concentrated milk to approximately its boiling point at atmospheric pressure, delivering said heated concentrated milk to a heat insulated container and permitting said heated milk to remain in said container under the action of its own contained heat but without addition of extraneous heat for a substantial length of time and then drying the milk thus treated to solid form.

4. A process for producing a dry milk product which comprises concentrating the raw milk to a substantial degree, subjecting the concentrated milk to a heat treatment which consists in heating and maintaining the said milk at a temperature substantially above ordinary atmospheric temperature for an extended time and then drying the milk thus treated to solid form whereby a product of altered flavor, improved solubility and better keeping qualities is obtained.

5. A process for producing a dry milk product in powdered form which comprises adding to the milk about 2% of sugar calculated on the weight of the milk, concentrating the mixture of milk and sugar under reduced pressure to a specific gravity of approximately 14 degrees Baumé, heating and homogenizing the said concentrated milk by passing into it a current of steam to raise the temperature of the milk to substantially its boiling point at atmospheric pressure, delivering said heated milk to a heat insulated tank and permitting it to remain in said tank under the influence of its own contained heat for approximately one hour and then spray-drying the said milk to produce a dry product.

Signed at New York city, in the county of New York and State of New York, this 30th day of March, A. D. 1923.

WHARTON B. McLAUGHLIN.